(12) United States Patent
Kalkbrenner et al.

(10) Patent No.: US 9,411,145 B2
(45) Date of Patent: Aug. 9, 2016

(54) TEST SAMPLE DEVICE AND TEST METHOD FOR AN OPTICAL MICROSCOPE WITH SUBWAVELENGTH RESOLUTION

(71) Applicant: Carl Zeiss Microscopy GmbH, Jena (DE)

(72) Inventors: Thomas Kalkbrenner, Jena (DE); Michael Totzeck, Schwaebisch Gmuend (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 541 days.

(21) Appl. No.: 13/972,749

(22) Filed: Aug. 21, 2013

(65) Prior Publication Data

US 2014/0055593 A1 Feb. 27, 2014

(30) Foreign Application Priority Data

Aug. 22, 2012 (DE) .......................... 10 2012 214 933

(51) Int. Cl.
| | |
|---|---|
| *H04N 7/18* | (2006.01) |
| *G02B 21/36* | (2006.01) |
| *G02B 21/34* | (2006.01) |
| *G02B 27/34* | (2006.01) |
| *G02B 27/36* | (2006.01) |

(52) U.S. Cl.
CPC .............. *G02B 21/365* (2013.01); *G02B 21/34* (2013.01); *G02B 27/34* (2013.01); *G02B 27/36* (2013.01); *H04N 7/18* (2013.01)

(58) Field of Classification Search
CPC ...... G02B 21/365; G02B 21/34; G02B 27/34; G02B 27/36; H04N 7/18
USPC ........................................................... 348/79
See application file for complete search history.

(56) References Cited

U.S. PATENT DOCUMENTS

| | | | | |
|---|---|---|---|---|
| 2010/0328766 | A1* | 12/2010 | Griffin ................ | G02B 21/125 359/387 |
| 2012/0069171 | A1* | 3/2012 | Kodaira ............... | G02B 21/365 348/79 |
| 2012/0237138 | A1* | 9/2012 | Potapov ............... | G01N 23/225 382/294 |

OTHER PUBLICATIONS

Steinhauer, Christian, et al., "DNA-Origami als Nanometerlineal für die superauflösende Mikroskopie," Angewandte Chemie, vol. 121, pp. 2-7 (2009).

* cited by examiner

*Primary Examiner* — Allen Wong

(74) *Attorney, Agent, or Firm* — Christensen Fonder P.A.

(57) ABSTRACT

A test sample device for an optical microscope which images a sample in different light states with a local resolution in the subwavelength range of the visible spectral range, wherein the test sample device comprises: a test piece, which is designed to be microexamined with the microscope and has a surface on which nanostructures are arranged, wherein each nanostructure, viewed along the surface, has a dimension in the subwavelength range, wherein the nanostructures are spaced apart from one another by an amount which lies above the wavelength of the visible spectral range, and wherein the nanostructures are switchable collectively between a bright state, in which they illuminate, and a dark state, in which they do not illuminate, and a drive, which is designed to move the test piece in the subwavelength range, whereby the different light states can be realized by different movement states of the test piece.

19 Claims, 2 Drawing Sheets

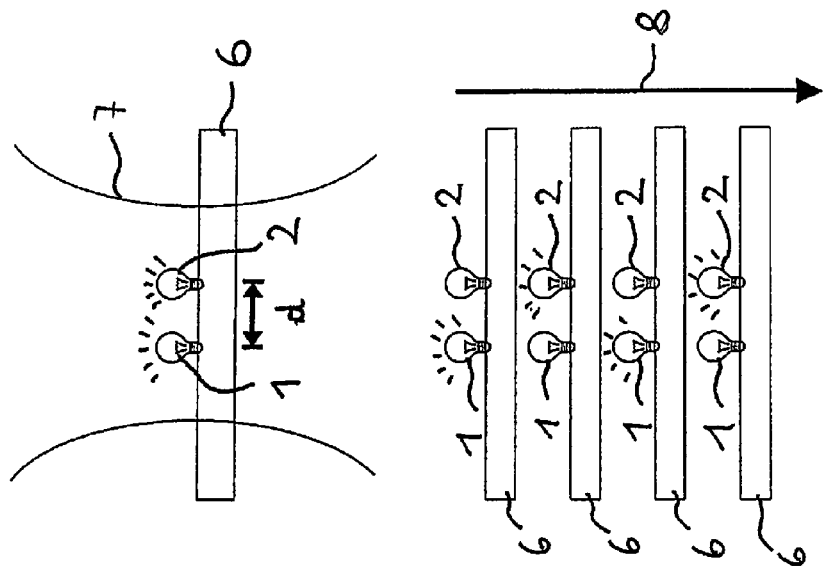
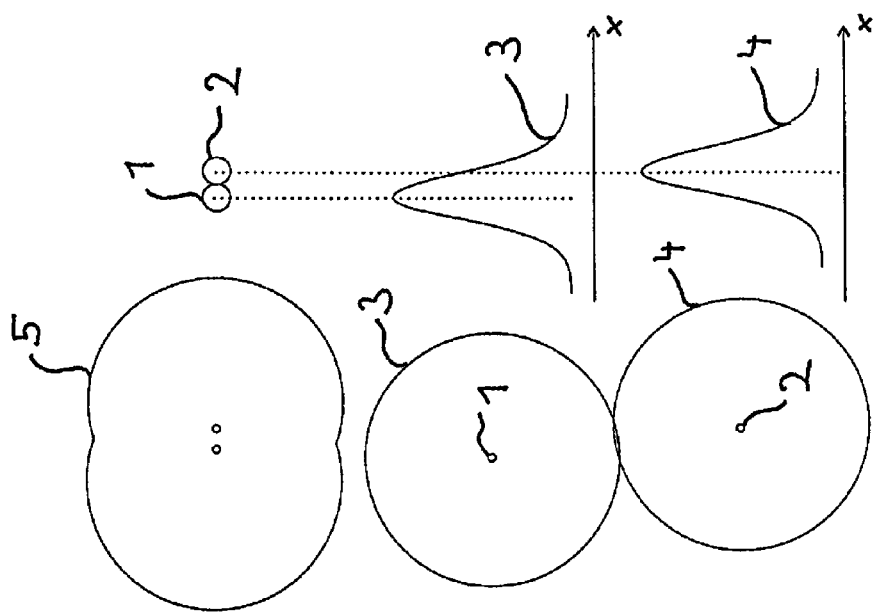
Fig. 2
Fig. 1

TEST SAMPLE DEVICE AND TEST METHOD FOR AN OPTICAL MICROSCOPE WITH SUBWAVELENGTH RESOLUTION

PRIORITY CLAIM

The present application claims priority to German Patent Application No. 102012214933.3 filed on Aug. 22, 2012, which said application is incorporated by reference in its entirety herein.

FIELD OF THE INVENTION

The invention relates to a test sample device and a test method for an optical microscope which images a sample in different light states with a spacial resolution in the subwavelength range of the visible spectral range, wherein the test uses a test piece which is designed for the microscope.

BACKGROUND OF THE INVENTION

High-resolution microscopy methods are particularly important in the field of microscopy at present. These are microscopy methods which achieve a local resolution in a sample that is increased beyond the optical resolution limit which results according to Abbe's theory. Such microscopy methods are e.g. PALM, STORM, d-STORM or GSDIM. They are based on the highly precise localization of individual fluorescent fluorophores in that it is ensured that the fluorophores fluoresce in as isolated a manner as possible. It is then possible, for the recorded radiation of such an isolated fluorophore, to determine the location of the fluorophore with a spacial resolution that exceeds the diffraction limitation, thus Abbe's theory. The location is determined with a precision up to the nanometer range using highly sensitive cameras in widefield. If this process is repeated several times for the sample, such that as far as possible all fluorophores have been imaged, isolated, once and localized, an image can be assembled from the several frames.

Localization-based high-resolution microscopy thus images a sample in different light states and achieves a local resolution in the subwavelength range of the visible spectral range, i.e. of light.

Tests that show the resolution are indispensable for the development of such microscopy methods and microscopes, but also for testing existing systems, for fault finding and, not least, for demonstrating and marketing high-resolution microscopes. For this, samples are needed, the structures of which are well-known, in order to test whether the microscope can image these known structures with the desired resolution.

Although it is known in the state of the art to produce periodic structures with defined sizes or spacings and to use these as test samples for microscopy, these test samples are not suitable for the mentioned localization-based high resolution approach. For the reasons mentioned at the beginning, localization-based high-resolution microscopy requires fluorescence molecules which can be excited to fluorescence radiation individually. Periodic structures with defined sizes and spacings do not meet this requirement.

Furthermore, resolution tests are known in the state of the art which modulate the amplitude or phase of the illuminating light. Such resolution tests are also not suitable for localization-based high-resolution microscopy, thus for a microscope which images a sample in different light states.

Therefore, biological samples that have correspondingly marked structures are currently used for these microscopy methods. The following disadvantages result here:

1. The samples have a low durability. Therefore, it is not possible to prepare these samples beforehand and send them to a user.

2. In the case of biological samples, reproducibility is limited in principle. Thus it is not known precisely which structure is present in the test.

3. Biological samples are complex to handle, they require for example corresponding culture media, buffers etc., which precludes a simple checking or demonstration of a localization-based high-resolution microscope.

4. Finally, the structures used are not strictly predefined, as biological samples always have a certain variability. A resolution test that can be repeated is thus unachievable.

In the state of the art, the use of a so-called DNA origami was proposed by Steinhauer et al., Angew. Chem., 121, 2, 2009. Fluorophores are bound at particular points in such DNA origami structures, with the result that two fluorophores are arranged with a particular spacing in the sub-100 nm range. However, the named limitations with respect to durability and handling also exist in these samples, as the fluorophores first have to be brought into their switchable state by a chemical redox system. In addition, the spacings of the fluorophores are not as well-defined as is desired, because DNA structures bend. It is also difficult to achieve the binding of the DNA structures to a substrate surface in such a defined way that there are no differences between the theoretically expected spacing of the bound fluorophores and the real spacing influenced by projection effects. In addition, it is possible to attach only one or a few molecules per binding position. As fluorophores normally bleach in localization-based high-resolution microscopy, the samples would, as a result, only be usable for quite a short time. In addition, there are localization microscopes which expect a particular blinking statistic of the fluorophores or require a modification of this blinking statistic. This is also not possible with the DNA origami structures according to Steinhauer.

SUMMARY OF THE INVENTION

A feature and advantage of embodiments of the invention is therefore to provide a test sample device for an optical microscope which images a sample in different light states with a local resolution in the subwavelength range of the visible spectral range, which makes it possible to reproducibly test such a microscope without the problems named.

This may be achieved according to the invention by a test sample device for an optical microscope which images a sample in different light states with a spacial resolution in the subwavelength range of the visible spectral range, wherein the test sample device comprises: a test piece, which is designed to be microexamined with the microscope and has a surface on which nanostructures are arranged, wherein each nanostructure, viewed along the surface, has a dimension in the subwavelength range, wherein the nanostructures are spaced apart from one another by an amount which lies above the wavelength of the visible spectral range, and wherein the nanostructures are switchable collectively between a bright state, in which they illuminate, and a dark state, in which they do not illuminate, and a drive, which is designed to move the test piece in the subwavelength range (in particular during the dark state), whereby the different light states can be realized by different movement states of the test piece.

This may be achieved according to the invention by a test method for an optical microscope which images a sample in different light states with a spacial resolution in the subwavelength range of the visible spectral range, wherein a test piece is placed in the microscope for microexamination, which test piece has a surface on which nanostructures are arranged, wherein each nanostructure, viewed along the surface, has a dimension in the subwavelength range, wherein the nanostructures are spaced apart from one another by an amount which lies above the wavelength of the visible spectral range, and the nanostructures are made to illuminate collectively, and the test piece is moved in the subwavelength range, whereby the different light states are realized by different movement states of the test piece.

An embodiment of the invention is to provide a test sample which has nanostructures, the spacing of which would not be at all suitable intrinsically for testing the microscope because it is larger than the resolution that the microscope is supposed to achieve. By means of the drive, the test piece can be moved such that two movement states are realized one after the other in time, in which states the position of the test piece, and thus of the array of nanostructures differs by a spacing that is smaller than the light wavelength and thus lies in the order of magnitude that is to be resolved with the microscope. The invention thus uses structures which would not be suitable intrinsically for a test in order to test the resolution limit of the microscope, and nevertheless makes it possible to realize different light states differing in that structures which are smaller than the wavelength of the light illuminate at positions which, for their part, are spaced apart by less than the wavelength of the light.

To test a localization-based microscope, it is necessary for the individual light states to be stable in themselves. The nanostructures are therefore configured such that they are switchable between a bright state, in which they collectively illuminate, and a dark state, in which they collectively do not illuminate. The movement or shift of the test piece takes place exclusively during the dark state, with the result that the two light states are each stable in themselves and are not intermixed by the movement process.

In one embodiment, the test sample device is realized by a plate with nanostructures in the form of holes which each have a diameter that is smaller than the light wavelength. A light source lits the plate from behind, with the result that the holes illuminate collectively. For the movement, it suffices to shift the plate.

As is known, transmission through subwavelength holes is very low. The transmission is proportional to (hole diameter/wavelength)$^4$, with the result that e.g. the transmission is $(20/500)^4 \approx 2.5 \times 10^{-6}$ for 20-nm holes. This is not disadvantageous here, but is actually advantageous because of the low photon numbers that often occur in high-resolution microscopy methods (such as e.g. in PALM) and the EMCCD cameras. Typically only a few 100 to 1,000 photons are collected per molecule would in these methods. The test device, thus, simulates real samples quiet well, even regarding intensity.

In one embodiment, the plate is provided in the form of a transparent substrate on which the metal layer, for example a silver layer, is arranged which has the nanostructures in the form of the holes. A particularly compact structure is achieved in one embodiment having a metal layer formed on a light source, for example an LED or an OLED.

Another embodiment comprises the plate designed as a transparent plate in which light is diffused by total internal reflection and coupled out at interruptions on the surface (small spots).

The test device or the test method makes it easily possible to simulate a desired spectral behaviour of the sample. For this, only the illumination source, which illuminates the test piece and/or makes the nanostructures illuminate collectively, need be provided with spectral properties desired for a microscope or microscopy method to be tested or demonstrated. One embodiment, thus, comprises a spectrally adjustable illumination source, because the test device can then be used for a large number of microscopes and microscopy methods. Different fluorescent dyes can be simulated by the choice of the spectrum of the illumination source.

A 2D piezoelectric actuator or a MEMS device come into consideration as drive for the movement.

Owing to the small image field of usual high-resolution microscopes, a maximum spacing of successive movement positions of 10 to 100 nm is sufficient for most embodiments.

The illuminating nanostructures is realized in one embodiment by elements which are excited to illuminate by means of external radiation, for example by quantum dots. In this case, the pictures that are taken during the movement can be disregarded in the evaluation. A permanent external radiation could therefore be used to excite the illumination.

However, some embodiments switch the excitation radiation on and off in synchronized manner with the movement, with the result that no excitation radiation is emitted when the test piece is shifted. If quantum dots are used, the usual emission filters for suppressing the excitation radiation can be switched on in usual manner on the microscope side.

In the test sample device according to the invention, the drive of a preferred embodiment moves the test pieces by a distance that is shorter than the spacing of two adjacent nanostructures, e.g. by a value from the range of from 10 to 100 nm.

Furthermore, there is provided a test sample device for an optical microscope which images a sample in different light states with a spacial resolution in the subwavelength range of the visible spectral range, wherein the test sample device comprises a test piece, which is designed to be microexamined with the microscope and has a surface on which at least one nanostructure is arranged, wherein each nanostructure, viewed along the surface, has a dimension in the subwavelength range and the nanostructure(s) is/are switchable (collectively) between a bright state, in which it/they illuminate(s), and a dark state, in which it/they does not/do not illuminate, and a drive, which is designed to move the test piece in the subwavelength range (in particular during the dark state), whereby the different light states are realized by different movement states of the test piece.

Where device features are described above or below, they also apply analogously to embodiments of the test sample method. The same applies to the description of method features and their relation to embodiments of the test sample device.

It is understood that the features mentioned above and those yet to be explained below can be used, not only in the stated combinations, but also in other combinations or alone, without departing from the spirit and scope of the present invention.

DESCRIPTION OF THE FIGURES

The invention is explained in further detail below by way of example with reference to the attached drawings which also disclose features of the invention.

FIG. 1 is a schematic representations to illustrate localization-based high-resolution microscopy and the resultant requirements for a test sample device, FIG. 2 is a further representation to illustrate localized high-resolution microscopy.

DETAILED DESCRIPTION

Figure 3:
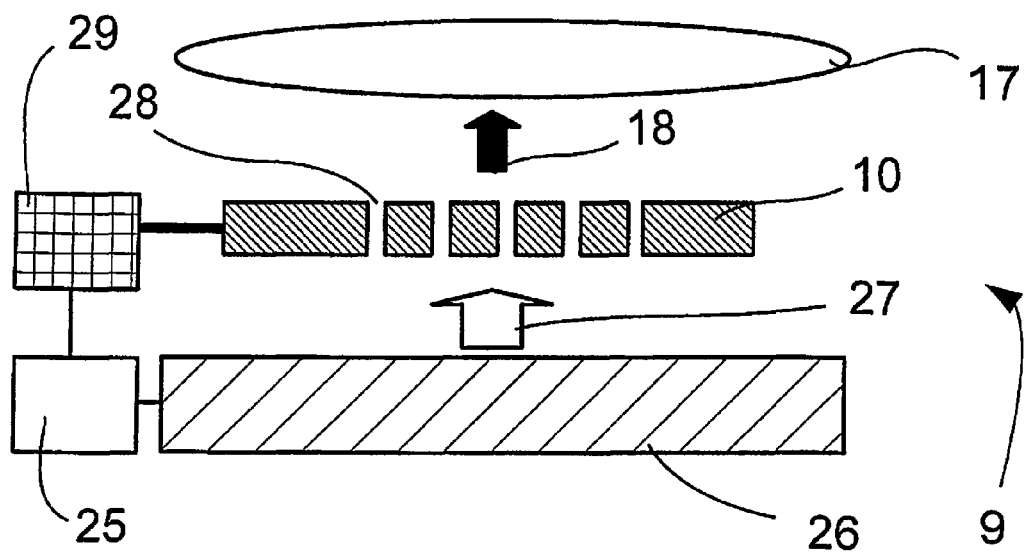
FIG. 3 is a schematic representation through a test sample device for testing a high-resolution microscope and FIGS. 4 and 5 are alternative embodiments for elements of the test sample device of FIG. 3.

FIGS. 1 and 2 illustrate the requirements of localizing high-resolution microscopy with respect to a test sample with which the functioning or resolution of a high-resolution microscope can be demonstrated.

If two emitters 1 and 2 are observed which illuminate in a sample, for example after they have been excited to fluorescence, these emitters 1 and 2 can be distinguished only when their diffraction patterns 3 and 4 respectively can be separated from one another. If the emitters 1 and 2 lie so close to one another that the diffraction patterns 3 and 4 cannot be distinguished visually, a common diffraction pattern results, which can be for example an enlarged Airy disc, if both emitters illuminate. It is not possible to say a priori whether the diffraction pattern 5 originates from two adjoining emitters 1 and 2, thus formed from the superimposition of the diffraction patterns 3 and 4, or whether only a single emitter produced the diffraction pattern 5. It is to be pointed out that the diffraction patterns 3, 4 and 5 in FIG. 1 are only drawn in schematically as sharply defined circles. For example, the structure, reproduced in the diffraction pattern 5 of FIG. 1, which suggests the superimposition of two individual diffraction patterns 3 and 4, cannot be recognized with a microscope.

Localization-based high-resolution microscopy is able to resolve the position of two such emitters 1 and 2 of a sample 6 even if the emitters 1, 2 are spaced by a gap d which would not be distinguishable within the optical resolution limit. FIG. 2 shows this schematically in the upper part by a beam waist 7 which results from the point-spread function of the microscope used. Inside this beam waist 7 the emitters 1 and 2 lie spaced by the sample 6 and could not be distinguished if they both illuminate at the same time, as is represented schematically in the upper part of FIG. 1.

The localization-based high-resolution microscopy effects that the two emitters 1 and 2 in the sample 6 illuminate one after the other and are imaged one after the other. This happens several times in the course of a process 8, with the result that the sample is imaged in different light states. For each light state, the position of the respectively illuminating emitter 1 or 2 is determined, because it is known that the diffraction pattern 3 or 4 originates only from one single emitter. Based on the representation of FIG. 1, the center of the diffraction pattern 3 or 4 is determined depending on which of the emitters illuminated. Thus, the location of the emitters can be localized a great deal more precisely than the point-spread function or the beam waist 7 allows.

This type of localization is possible with different microscopy methods, as already mentioned in the general part of the description. The procedure of localization-based high-resolution microscopy is relevant for the test sample device described below only to the extent that the microscope requires a sample that can be switched into different light states in which structures illuminate alternately which have a spacing and a dimension smaller than the wavelength of the microscope used. Naturally, this also applies to a test sample device simulating a real sample.

FIG. 3 shows a test sample 9. It comprises a test piece 10 which is lit from behind by an illumination source 26 which emits illumination radiation 27 onto the opposite side of the test piece 10. The term "opposite" relates to the fact that imaging by a microscope 17.

The test piece 10 comprises an array of holes 28. Each hole 28 has a dimension that is smaller than the light wavelength which is used in imaging 18. Each hole 28 thus represents a nanostructure. In the array, the holes 28 are spaced apart from each other by an amount that is larger than the wavelength which is used in the imaging 18.

The holes 28 illuminate due to the illumination radiation 27. They are imaged with the microscope 17.

The test piece 10 is connected to a drive 29 which moves the test piece 10 laterally, i.e. transverse to the direction of the imaging 18, by an amount or increment that is smaller than the wavelength used in the imaging 18. During such a shift process from a first into a second movement position of the test piece 10, a control unit 25 which controls the drive 29 and the illumination source 26 switches off the illumination radiation 27. It is only switched on again after the test piece 10 has reached the second movement position. Two different light states of the test piece 10 are thus realized in which nanostructures, namely the holes 28, which are smaller than the wavelength illuminate in different sites which, for their part, are spaced apart by less than the wavelength of the imaging 18.

The test sample 9 thus provides the microscope 17 with different light states, which makes possible a simple testing or demonstration of the microscope or of the microscopy method.

Figure 4:
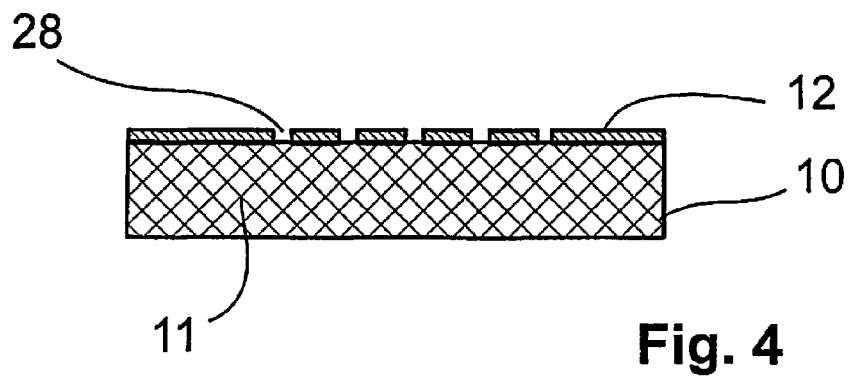

FIG. 4 shows an exemplary version of the test piece 10. Here, it consists of a substrate 11 to which a metal layer 12 is applied, which has the holes 28. The holes 28 are introduced by means of FIB (Focused Ion Beam, described e.g. in http://en.wikipedia.org/wiki/Focused_ion_beam). The illumination radiation 27 irradiated on the bottom of the piece is transmitted by the holes.

Alternatively, isolated holes can be produced by applying polystyrene balls (small balls with defined diameter, which are commercially available and are also called polystyrene beads) to the substrate 11, vapour-depositing a metal film onto the substrate and washing off or dissolving the balls. Where the balls had been, there are now holes 28 with the diameter of the balls.

Figure 5:
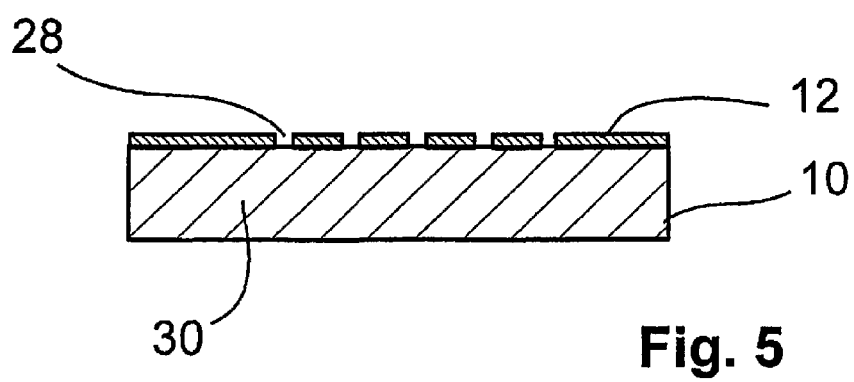

FIG. 5 shows a more compact structure in which the test sample 10 directly comprises a light source, for example LEDs 30 on the top side of which the metal layer 12 is formed. The LEDs 30 then emit through the holes 28. The light intensity can be regulated easily via current control of the LEDs 30.

To test or demonstrate a high-resolution microscope or microscopy method, the following steps are carried out. In a first position of the test piece 10, nanostructures, thus the holes 28 in the embodiment of FIG. 3, are made to illuminate. The intensity of the illumination, e.g. the source 26, is set suitably and an image is recorded with the microscope 17. After a period of time, which is predetermined by the image acquisition of the microscope 17, the illumination is switched off and the test piece 10 shifts into a second position being spaces by less than the optical resolution of the microscope 17. The above-named steps are then repeated. Naturally, this is possible for several second positions.

In addition to the embodiments already mentioned in the general part, the following modifications are also possible for some embodiments:

The form of the nanostructures is not limited to holes 28. Other nanoapertures can also be used. The array can also be designed as an already-calibrated pattern or grating.

The spacing of the apertures, for example the holes 28, must be at least larger than the simple diameter of a point-spread image which results with the microscope 17 through the imaging 18.

The array of the nanostructures can be symmetrical, but need not be. It is only important that the movement of the individual apertures is known sufficiently precisely, for example with a precision of less than 100 nm.

The array of the nanostructures can be designed e.g. such that the field of vision of the microscope is filled in completely, or at least as completely as possible, with the result that any field-dependent imaging quality can be determined with a (preferably single) measurement.

The mechanical shift can take place between exactly two movement positions. However, several, i.e. more than two movement positions are also possible, wherein the requirement that the shift travel distance is smaller than the resolution limit of the imaging 18.

The mechanical shift, and also the switching on and off of the illumination of the nanostructures, can also take place periodically according to a frequency. The blinking behaviour of fluorophores can be imitated in microscopy by the choice of the frequency.

The invention claimed is:

1. A test sample device for an optical microscope which images a sample in different light states with a spacial resolution in the subwavelength range of the visible spectral range, wherein the test sample device comprises:
   a test piece having a surface on which nanostructures are arranged,
      wherein each nanostructure, viewed along the surface, has a dimension in the subwavelength range,
      wherein the nanostructures are spaced apart from one another by an amount that lies above the wavelength of the visible spectral range, and
      wherein the nanostructures are switchable collectively between a bright state, in which they illuminate, and a dark state, in which they do not illuminate, and
   a drive for moving the test piece by increments in the subwavelength range,
   whereby the different light states can be realized by different movement states of the test piece.

2. The test sample device of claim 1, in which the drive is adapted to move the test piece during the dark state.

3. The test sample device of claim 1, wherein the test piece has an array of holes and a light source illuminating the holes from behind, wherein the light source emits light having a light wavelength and each hole has a diameter smaller than the light wavelength.

4. The test sample device of claim 3, wherein the light source is adjustable regarding intensity of the light.

5. The test sample device of claim 1, wherein the test piece comprises a light source which is provided with a metal layer in which the array of holes is formed.

6. The test sample device of claim 5, wherein the light source comprises an LED or OLED.

7. The test sample device of claim 1, wherein the drive moves the test piece by increments having a width from 10 to 100 nm.

8. Test sample device of claim 1, wherein the drive moves the test piece by increments having a width of 10 to 100 nm shorter than a spacing of two adjacent nanostructures.

9. The test sample device of claim 1, comprising a control unit for controlling the drive with respect to the movement and the nanostructures with respect to the illumination and switches off the illumination during movement of the test piece.

10. A test method for an optical microscope which images a sample in different light states with a spacial resolution in the subwavelength range of the visible spectral range comprising:
    providing a test piece with a surface on which nanostructures are arranged,
       wherein each nanostructure, viewed along the surface, has a dimension in the subwavelength range, and wherein the nanostructures are spaced apart from one another by an amount that lies above the wavelength of the visible spectral range, and
    placing the test piece in the microscope for microexamination;
    illuminating the nanostructures collectively and darkening the nanostructures collectively; and
    moving the test piece by increments in the subwavelength range thereby realizing the different light states by different movement states of the test piece.

11. An optical microscope with a test sample device for imaging a sample in different light states with a spacial resolution in the subwavelength range of the visible spectral range, wherein the test sample device comprises:
    a test piece having a surface on which nanostructures are arranged,
       wherein each nanostructure, viewed along the surface, has a dimension in the subwavelength range,
       wherein the nanostructures are spaced apart from one another by an amount that lies above the wavelength of the visible spectral range, and
       wherein the nanostructures are switchable collectively between a bright state, in which they illuminate, and a dark state, in which they do not illuminate, and
    a drive for moving the test piece by increments in the subwavelength range,
    whereby the different light states can be realized by different movement states of the test piece.

12. The optical microscope of claim 11, in which the drive is adapted to move the test piece during the dark state.

13. The optical microscope device of claim 11, wherein the test piece has an array of holes and a light source illuminating the holes from behind, wherein the light source emits light having a light wavelength and each hole has a diameter smaller than the light wavelength.

14. The optical microscope device of claim 13, wherein the light source is adjustable regarding intensity of the light.

15. The optical microscope device of claim 11, wherein the test piece comprises a light source which is provided with a metal layer in which the array of holes is formed.

16. The optical microscope device of claim 15, wherein the light source comprises an LED or OLED.

17. The optical microscope device of claim 11, wherein the drive moves the test piece by increments having a width from 10 to 100 nm.

18. The optical microscope of claim 11, wherein the drive moves the test piece by increments having a width of 10 to 100 nm shorter than a spacing of two adjacent nanostructures.

19. The optical microscope device of claim 11, comprising a control unit for controlling the drive with respect to the movement and the nanostructures with respect to the illumination and switches off the illumination during movement of the test piece.

* * * * *